United States Patent
Price et al.

(10) Patent No.: US 12,537,072 B1
(45) Date of Patent: Jan. 27, 2026

(54) IMMUNOGENIC RESPONSE PREDICTION BASED ON MAJOR HISTOCOMPATIBILITY COMPLEX (MHC) DATA

(71) Applicant: Amazon Technologies, Inc., Seattle, WA (US)

(72) Inventors: Layne Christopher Price, Seattle, WA (US); David Heckerman, Bellevue, WA (US); Gil Sadeh, Herzliya (IL)

(73) Assignee: Amazon Technologies, Inc., Seattle, WA (US)

( * ) Notice: Subject to any disclaimer, the term of this patent is extended or adjusted under 35 U.S.C. 154(b) by 1128 days.

(21) Appl. No.: 17/332,735

(22) Filed: May 27, 2021

(51) Int. Cl.
*G16H 50/20* (2018.01)
*G06N 20/00* (2019.01)
*G16B 5/20* (2019.01)
*G16B 40/00* (2019.01)

(52) U.S. Cl.
CPC .............. *G16B 5/20* (2019.02); *G06N 20/00* (2019.01); *G16B 40/00* (2019.02); *G16H 50/20* (2018.01)

(58) Field of Classification Search
CPC .......... G16B 5/20; G16B 40/00; G06N 20/00; G16H 50/20
See application file for complete search history.

(56) References Cited

U.S. PATENT DOCUMENTS

| | | | |
|---|---|---|---|
| 9,249,187 B2 | 2/2016 | Degan et al. | |
| 11,260,116 B2 | 3/2022 | Stanford et al. | |
| 2006/0094649 A1 | 5/2006 | Keogh et al. | |
| 2016/0310584 A1 | 10/2016 | Fritsch et al. | |
| 2020/0243164 A1 | 7/2020 | Qiao et al. | |
| 2021/0304840 A1 | 9/2021 | Mourtada et al. | |
| 2022/0076783 A1 | 3/2022 | Cristescu et al. | |
| 2023/0173045 A1 | 6/2023 | Price et al. | |
| 2023/0338491 A1 | 10/2023 | Mo et al. | |
| 2025/0046393 A9 | 2/2025 | Biskup et al. | |

FOREIGN PATENT DOCUMENTS

| | | | |
|---|---|---|---|
| EP | 3618071 A1 | 3/2020 | |
| JP | 2009221213 A | 10/2009 | |
| JP | 2019534884 A | 12/2019 | |
| JP | 2020073553 A | 5/2020 | |
| WO | WO-20040072249 A1 * | 4/2004 | ............ C40B 30/04 |
| WO | 2017011660 A1 | 1/2017 | |
| WO | 2019050994 A1 | 3/2019 | |
| WO | 2020132235 A1 | 6/2020 | |

OTHER PUBLICATIONS

Li, Guangyuan, et al. "DeepImmuno: deep learning-empowered prediction and generation of."Improving cancer immunotherapy through the lens of single-cell genomics and neoantigen discovery 2019, (Year: 2019).*

(Supplemental Methods of DeepImmuno: Deep learning-empowered prediction and generation of immunogenic peptides for T cell immunity (Year: 2019).*

O'Donnell, Timothy J., et al. "MHCflurry: open-source class I MHC binding affinity prediction. "Cell systems7.1 (2018) (Year: 2018).*

Chang, Kuan Y., Anish Suri, and Emil R. Unanue. "Predicting peptides bound to I-Ag7 class II histocompatibility molecules using a novel expectation-maximization alignment algorithm. "Proteomics, 2007 (Year: 2007).*

Samdani R, Chang, M, and Roth D, 2012 Conference of the North American Chapter of the Association for Computational Linguistics: Human Language Technologies, pp. 688-698, 2012 (Year: 2012).*

Kim, S et al. "Neopepsee: accurate genome-level prediction of neoantigens by harnessing sequence and amino acid immunogenicity information." Annals of oncology : official journal of the European Society for Medical Oncology vol. 29,4 (2018): (Year: 2018).*

Weimer, Marc et al. "The Impact of Data Transformations on Concentration-Response Modeling." Toxicology letters 213.2 (2012) (Year: 2012).*

U.S. Appl. No. 17/332,719, "Assigning Peptides To Peptide Groups for Vaccine Development," Filed May 27, 2021.

Fraser et al., "Generation of a Universal CD4 Memory T Cell Recall Peptide Effective in Humans, Mice and Non-Human Primates." Vaccine, vol. 32, No. 24, May 19, 2014, pp. 2896-2903.

Sinigaglia et al., "Defining Rules for the Peptide-MHC Class II Interaction," Current Opinion in Immunology, vol. 6, No. 1, Feb. 1994, pp. 52-56.

Smahel et al., "The Effect of Helper Epitopes and Cellular Localization of an Antigen On the Outcome of Gene Gun DNA Immunization," Gene Therapy, vol. 21, Jan. 2, 2014, pp. 225-232.

Verhoef et al., "Des-Enkephalin-γ-Endorphin (DEγE): Biotransformation in Rat, Dog and Human Plasma," European Journal of Drug Metabolism and Pharmacokinetics, vol. 11, 1986, pp. 291-302.

U.S. Appl. No. 18/422,734, "Vaccine Development Based On a Peptide-To-Peptide Group Assignment," Filed Jan. 25, 2024.

(Continued)

*Primary Examiner* — Soren Harward
*Assistant Examiner* — Dawn Bickham
(74) *Attorney, Agent, or Firm* — Kilpatrick Townsend & Stockton LLP

(57) ABSTRACT

Immunogenic response prediction techniques are described. In an example, a system receives first training data that identifies a peptide, a first set of multiple major histocompatibility complex (MHC) molecules, and an immunogenic response associated with the peptide and the first set. The system updates a parameter of a first model based at least in part on the first training data. The first model is configured to determine a probability of causing the immunogenic response by a pair formed by the peptide and a MHC molecule from the first set. The system also receives second data that identifies a second set of MHC molecules, and generates, by using the first model and a second model, an immunologic response prediction of pairing the peptide with a MHC molecule from the second set. The second model is configured to generate at least one of peptide-MHC binding predictions or peptide-MHC cell surface presentation predictions.

17 Claims, 10 Drawing Sheets

(56) References Cited

OTHER PUBLICATIONS

Sabarth et al., "Induction of Homologous Rather than Heterologous Antigen-Specific CD4 T Cell Responses Is Critical for Functional CD8 T Cell Responses in Mice Transgenic for a Foreign Antigen," The Journal of Immunology, vol. 185 (8): 4590-4601, Oct. 15, 2010.
Goodwine, "Computer Architecture," Available Online at: https://controls.ame.nd.edu/microcontroller/main/node2.html, Sep. 29, 2002, 3 pages.
Tran et al., "Personalized Deep Learning of Individual Immunopeptidomes to Identify Neoantigens for Cancer Vaccines", Nature Machine Intelligence, vol. 2, No. 12, Nov. 16, 2020, pp. 764-771.

* cited by examiner

IMMUNOGENIC RESPONSE PREDICTION BASED ON MAJOR HISTOCOMPATIBILITY COMPLEX (MHC) DATA

BACKGROUND

Analysis of major histocompatibility complex (MHC) molecules and peptides that are bound by MHC molecules, can have various applications in the life sciences space. For instance, such analysis can develop the understanding of the functions of an immune system, such as the interactions between T-cells and antigen-presenting cells.

Artificial intelligence techniques are also used in the life sciences space. For instance, artificial intelligence models can be developed and deployed for diagnosis and disease identification, drug discovery, and vaccine development.

BRIEF DESCRIPTION OF THE DRAWINGS

Various embodiments in accordance with the present disclosure will be described with reference to the drawings, in which.

DETAILED DESCRIPTION

Figure 1:
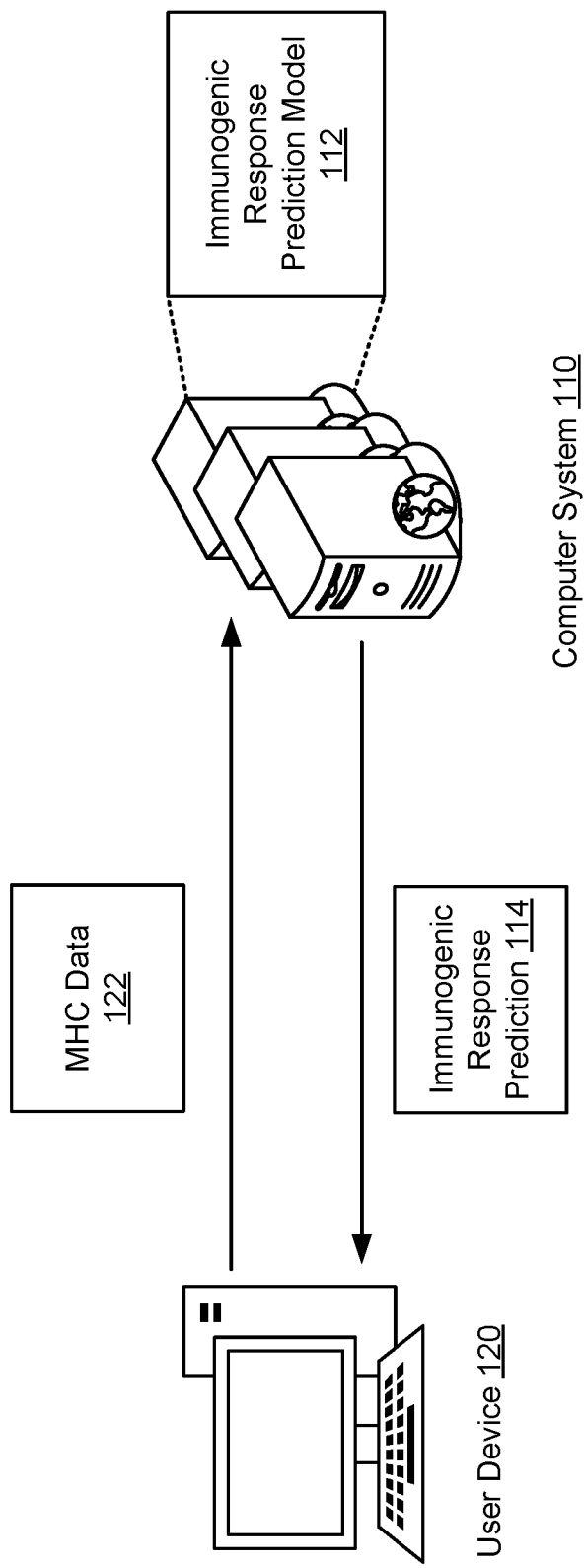
FIG. 1 illustrates an example of a computing environment for immunogenic response prediction according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to, among other things, predicting an immunogenic response based on major histocompatibility complex (MHC) data. In an example, MHC data about a subject, such as a human or another mammal, identifies MHC molecules of the subject. For example, MHC class II alleles (for example for HLA-DP HLA-DQ and HLA-DR) expressed in the subject are determined. This data is input to a computer system that hosts an immunogenic response prediction model. Based on a repertoire of available peptide amino acid sequences (i.e., class II peptide sequences), the immunogenic response prediction model generates an immunogenic response prediction of pairing an available peptide sequence with an MHC molecule of the subject. The immunogenic response prediction can include a probability of a positive immunogenic response (e.g., the likelihood of the pair eliciting a CD4+ immunogenic response). This type of response can be used in the development of a vaccine, such as but not limited to a cancer vaccine, for the subject.

The immunogenic response prediction model can include a first model, such as a machine learning (ML) model, that is configured to generate an MHC-based prediction, such as a peptide-MHC binding affinity prediction and/or a peptide-MHC cell-surface presentation prediction. In the case of an ML model, the configuration thereof relies on training data that identifies specific pairs of peptides and MHC molecules and the immunogenic response per pair (e.g., positive/negative or eliciting/not eliciting a CD4+ immunogenic response). This data may be referred to herein as MHC-restricted data given the known relationship between each peptide-MHC molecule and the corresponding type of immunogenic response.

Additionally, the immunogenic response prediction model can include a second model, such as a calibration model, that can generate an immunogenic response prediction from the MHC-based prediction of the first model. This second model can be configured by using MHC-unrestricted data: data that identifies a peptide, a set of multiple MHC molecules, and an immunogenic response associated with the peptide and the entire set (e.g., as expressed in a responsive subject). In comparison to the MHC-restricted data, the MHC-unrestricted data does not specifically identify a type of immunogenic response per pair of peptide and MHC molecule. Instead, the MHC-unrestricted data can identify the type of immunogenic response as generally being associated with all possible pairs formed by the peptide and different MHC molecules expressed in the subject. Configuring the second model can include, for example, determining latent relationships between a peptide and MHC molecules and updating parameters of the second model to reflect (e.g., numerically) such latent relationships.

Generally, the MHC-unrestricted data is more readily available and can be easier to generate than the MHC-restricted data. By using the MHC-unrestricted data, the second model can be configured to generate from the output of the first model immunogenic response predictions with a high degree of accuracy. Further, the MHC-unrestricted data can be also processed by the second model and the processed data can be used to further train the first model, thereby improving the prediction performance of this model. As such, the use of the MHC-unrestricted data improves the overall performance of the immunogenic response prediction model.

To illustrate, consider an example of human patient. The human patient may have six types of MHC class II molecules (e.g., MHC alleles), referred to as human leukocyte antigen (HLA) class II molecules. A genome sequence can be determined on a biopsy from the human subject to determine a set (e.g., a set of six or eight) of HLA class II molecules of the human patient (e.g., each element in the set identifies one HLA allele). A repertoire of peptides can be available for development of a vaccine. Data identifying the HLA class II molecules can be input to an immunogenic response prediction model. This model pairs peptides from the repertoire with the HLA class II molecules of the subject to generate candidate pairs of peptide-HLA class II molecules. For each candidate pair, the immunogenic response prediction model generates a CD4+ immunogenic response prediction indicating the likelihood that the candidate pair would elicit a positive CD4+ immunogenic response. The candidate pair(s) with the highest likelihood(s) (or likelihood exceeds a predefined threshold) can be used to generate the vaccine. In some embodiments, the vaccine is a cancer vaccine.

In the above illustration, to configure the immunogenic response prediction model, an ML model of the immunogenic response prediction model is trained first with MHC-restricted training data. This training data identifies peptide-HLA class II molecule pairs and the type of CD4+ immunogenic response per pair, where the pairs can correspond to one or more humans. The ML model is trained to predict peptide-HLA binding (e.g., how well or strong the binding is between a peptide and an HLA class II molecule that form a pair) and/or peptide-HLA cell surface presentation (e.g., the likelihood of an antigen cell presenting the peptide-HLA class II molecule). Thereafter, a calibration model is configured to determine latent relationships between peptides and HLA class II molecules from MHC-unrestricted data. Rather than identifying peptide-HLA class II molecule pairs, this training data identifies multiple peptides and, for each peptide, a corresponding set of HLA class II molecules and a corresponding type of CD4+ immunogenic response associated with that peptide and the corresponding set. The calibration model can be implemented as a layer that transforms (using a linear or a non-linear transformation) the output of the ML model into a CD4+ immunogenic response prediction.

Configuring the calibration model can follow an expectation-maximization approach. The MHC-unrestricted data can be organized in rows, where each row is a data element that identifies a peptide, HLA alleles, and a CD4+ immunogenic response type. For each data element, the calibration model outputs, in an expectation step (E-step), the probability that each HLA allele is responsible for the corresponding CD4+ immunogenic response type. In a maximization step (M-step), the ML model is retrained with the MHC-unrestricted training data, with each peptide in a data element paired with each possible HLA allele of the data element weighted by the allele probabilities determined in the E-step. The E- and M-steps are repeated until convergence. In each iterations, one or more parameters of the calibration model (e.g., the coefficients of the transformation) are updated until convergence, at which point the parameters are set. The expectation-maximization approach allows to iteratively estimate which HLA allele in each data is responsible for the type of CD4+ immunogenic response type, use this estimation to improve the models, and, upon convergence, determine which HLA allele in each data element has the highest probability of causing the CD4+ immunogenic response type when paired with the peptide of the data element. Upon completion of the configuration, the immunogenic response prediction model trained with MHC-restricted and MHC-unrestricted datasets for predicting binding and/or cell-surface presentation and a calibration model set up as a layer that transforms the output of the ML model into a CD4+ immunogenic response prediction.

In the interest of clarity of explanation, various embodiments are described herein using examples of peptides, MHC class II molecules, peptide-MHC binding predictions, peptide-MHC cell surface presentation predictions, and CD4+ immunogenic response predictions. However, the embodiments are not limited to such examples. For example, the embodiments similarly apply to sequences of peptides, other types of MHC molecules (e.g., MHC class I alleles), and other types of peptide-MHC based predictions.

FIG. 1 illustrates an example of a computing environment for immunogenic response prediction according to embodiments of the present disclosure. The computing environment includes a computer system 110 that hosts an immunogenic response prediction model 112. The computing environment also includes a user device 120 that is communicatively coupled with the computer system 110 over a data network (e.g., the internet). The user device 120 can send MHC data 122 about a subject, such as a human patient or another type of living being, to the computer system 110. In turn, the immunogenic response prediction model 112 processes the MHC data 122 to generate an immunogenic response prediction 114. The computer system 110 sends the immunogenic response prediction 114 to the user device 120 for presentation thereat.

In an example, the computer system 110 can be any suitable system that includes one or more processors and one or more memories storing computer-readable instructions executable by the one or more processors to configure the computer system 110 to host the immunogenic response prediction model 112 and communicate with the user device 120. For instance, the computer system 110 may be a server or a cloud computing service hosted in a data center.

In comparison, the user device 120 can be any suitable computing device that includes one or more processors and one or more memories storing computer-readable instructions executable by the one or more processors to configure the user device 120 to receive input about the MHC data 122, communicate with the computer system 110, and present the immunogenic response prediction 114. For instance, the user device 120 may be a smartphone, a tablet, a laptop, a desktop computer, a server, or a cloud computing service hosted in a data center.

Although FIG. 1 illustrates the computer system 110 and the user device 120 as being two separate computing components, embodiments of the present disclosure are not limited as such. For instance, the computer system 110 and the user device 120 can be integrated as a single computing component. Further, the configuration of the user device 120 need not be limited to receiving the MHC data 122. Instead, the user device 120 can also generate the MHC data 122. For instance, the user device 120 can be implemented as a genome sequencing system that generates the MHC data 122 and, automatically or upon request, sends the MHC data 122 to the computer system 110.

In an example, the MHC data 122 is specific to the subject. For instance, the MHC data 122 identifies a set of MHC class II molecules (e.g., MHC alleles) that are found in the subject. In this illustration, the MHC data 122 can be generated by performing a biopsy (e.g., on healthy or cancerous cells of the subject) and performing genome sequencing on the biopsy (including next generation sequencing (NGS)). In the case where the subject is a human, the MHC data 122 identifies between six and eight HLA alleles (e.g., one HLA-DP and -DQ, and one or two HLA-DR from each parent, and combinations of these).

The immunogenic response prediction 114 can indicate a likelihood of a CD4+ immunogenic response when one or more peptides available from a repertoire of peptides are paired with one or more MHC class II molecules of the subject. The repertoire can be a database storing information for cancer vaccine development. As such, the immunogenic response prediction 114 can indicate for a pair of peptide-MHC molecule the likelihood of this pair eliciting a positive immunogenic response in the subject. A vaccine can then be developed for the subject and can include a particular peptide(s) found to be effective when bounded with one or more MHC class II molecules of the subject.

Figure 2:
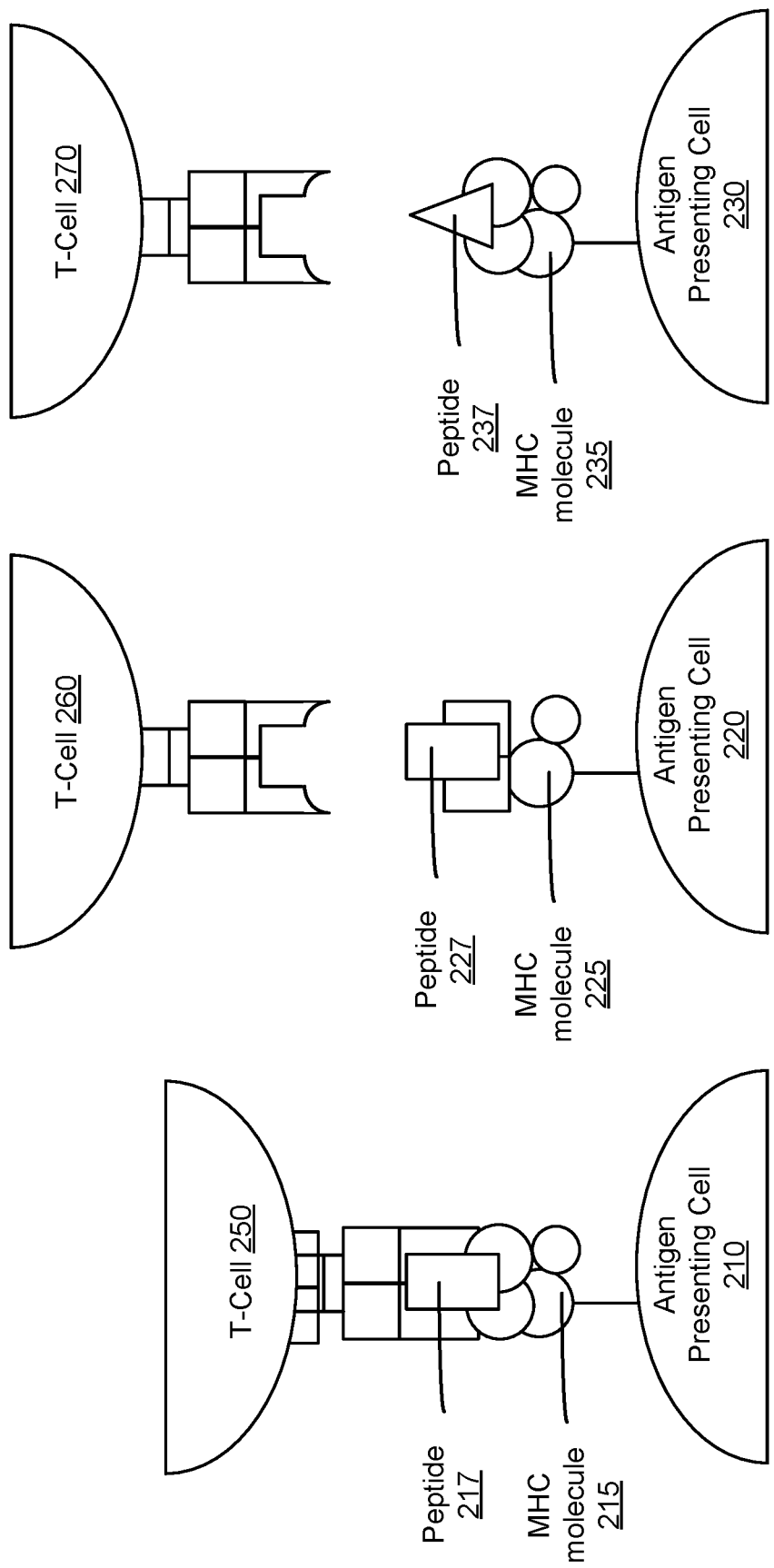
FIG. 2 illustrates an example of interactions between T-cells and antigen-presenting cells according to embodiments of the present disclosure.

FIG. 2 illustrates an example of interactions between T-cells and antigen-presenting cells according to embodiments of the present disclosure. Generally, an immunogenic response by a T-cell is triggered upon an antigen cell presenting at its surface a peptide-MHC class II molecule pair and the T-cell's receptor properly binding to the peptide-MHC class II molecule pair. Hence, a positive immunogenic response hinges on the peptide-MHC cell-surface presentation and peptide-MHC binding. As further described herein below, a first model (e.g., an ML model) can be configured (e.g., trained at least with MHC-restricted data) to predict the peptide-MHC cell-surface presentation and peptide-MHC binding. A second model (e.g., a calibration model) can be configured (e.g., by using at least MHC-unrestricted data) to transform the output of this model into a prediction for a positive immunogenic response.

Three interactions are shown in FIG. 2, labeled as recognition 201, no recognition 202, and no recognition 203. Starting with the left hand side of FIG. 2, an antigen presenting cell 210 (e.g., HLA-B8+) presents a pair of an MHC molecule 215 (e.g., MHC class II molecule of a particular MHC allele) and a peptide 217 (e.g., a particular sequence of amino acids). The presentation is at a surface of the antigen presenting cell 210 (e.g., through its surface membrane) and can depend on the elements of the pair (e.g., the specific MHC molecule 215 and the specific peptide 217). A T-cell 250 (e.g., HLA-B8+) has a receptor and this receptor can bind with the pair depending on the elements of the pair (e.g., the specific MHC molecule 215 and the specific peptide 217). Depending on the cell-surface presentation and binding strength, the T-cell 250 can recognize the antigen presenting cell 210 (shown as the recognition 201), which in turn triggers the positive immunogenic response.

In comparison, and as shown in the middle of FIG. 2, a T-cell 260 (e.g., HLA-B8+) does not recognize an antigen presenting cell 220 (e.g., HLA-B44+). The no recognition 202 is due to the T-cell 260's receptor not binding or not having a strong enough binding to an MHC molecule 225 that is presented along with a peptide 227 by the antigen presenting cell 220. In this example, the T-cell 260 and the peptide 227 are of the same types as the T-Cell 250 and the peptide 217, respectively. However, the MHC molecule 225 is different from the MHC molecule 215 (e.g., being of a different MHC alleles). Because the antigen cell 220 is not recognized, no positive immunogenic response is elicited.

As also shown on the right hand side of FIG. 2, a T-cell 270 (e.g., HLA-B8+) does not recognize an antigen presenting cell 230 (e.g., also HLA-B8+). The no recognition 203 is due to the T-cell 270's receptor not binding or not having a strong enough binding a peptide 237 that is presented along with a an MHC molecule 235 by the antigen presenting cell 230. In this example, the T-cell 270 and the MHC molecule 235 are of the same types as the T-Cell 250 and the MHC molecule 215, respectively. However, the peptide 237 is different from the peptide 217 (e.g., being a different amino acid sequence). Because the antigen cell 230 is not recognized, no positive immunogenic response is elicited.

The above illustration of FIG. 2 shows that a positive immune response is elicited when only a T-cell can properly bind to the peptide-MHC molecule pair presented by an antigen cell. No positive immune response is elicited when the binding is non-existent or is weak. This can be due to the specific types of peptide and/or MHC molecule as illustrated in FIG. 2 or because of the cell-surface presentation (and/or lack thereof) of the pair by the antigen presenting cell.

Figure 3:
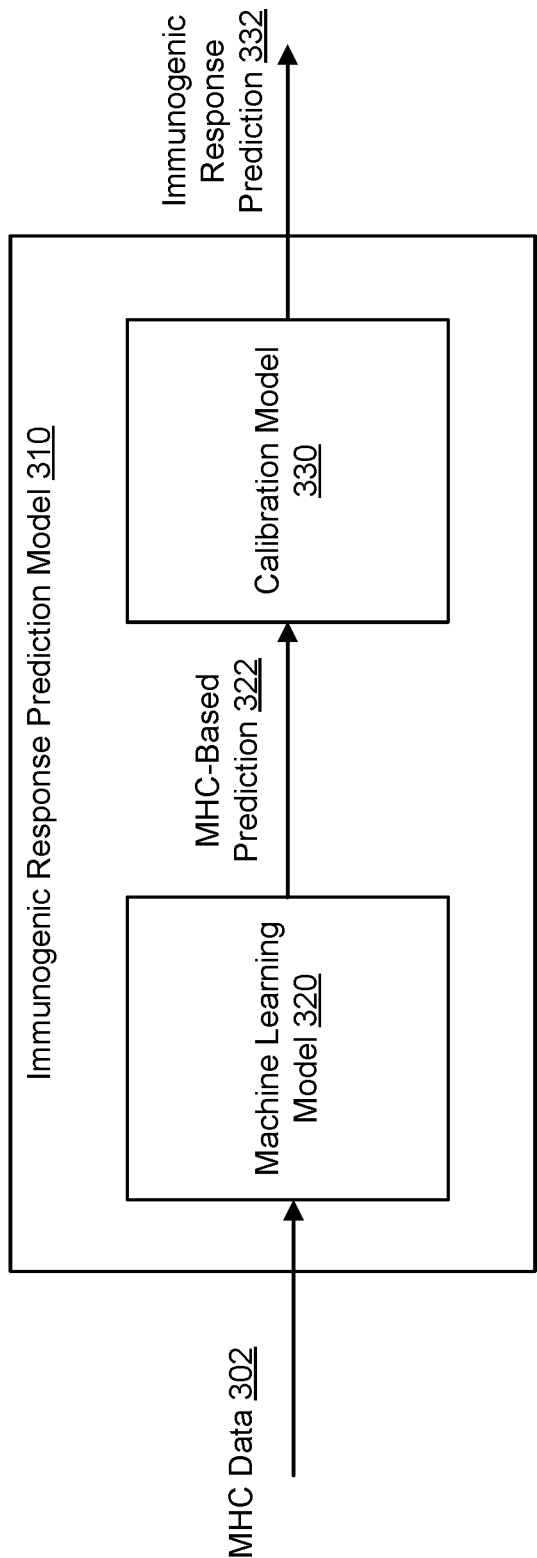
FIG. 3 illustrates an example of an immunogenic response prediction model according to embodiments of the present disclosure.

FIG. 3 illustrates an example of an immunogenic response prediction model 310 according to embodiments of the present disclosure. The immunogenic response prediction model 310 is an example of the immunogenic response prediction model 112 of FIG. 1. In particular, the immunogenic response prediction model 310 receives and processes MHC data 302, similar to the MHC data 122 of FIG. 1 to then generate an immunogenic response prediction 332, similar to the immunogenic response 114 of FIG. 1. As described in connection with FIG. 2, a positive immunogenic response (e.g., an elicited CD4+ immunogenic) depends on a number of factors including, for instance, peptide-MHC binding and peptide-MHC cell-surface presentation. Accordingly, and as shown in FIG. 3, the immunogenic response prediction model 310 includes two models: an ML model 320 configured to output peptide-MHC binding predictions and/or peptide-MHC cell-surface presentation predictions, and a calibration model 330 configured to transform outputs of the ML model 320 into immunogenic response predictions 332.

In an example, the ML model 320 is implemented as an artificial intelligence neural network. The MHC data 302 can be specific to a subject and identifies MHC class II molecules of the subject (e.g., between six and eight HLA alleles for a human subject). The ML model 320 (or an input system or service thereto) can pair each one of the MHC class II molecule with a candidate peptide from a repertoire of peptides. As a result, for each MHC class II molecule of the subject, one or more candidate pairs are formed, each of which contains the MHC class II molecule and a different peptide. The candidate pairs corresponding to different combinations of peptides and MHC class II molecules (e.g., the six to eight HLA alleles) are processed through hidden layer of the ML model 320. An output layer of the ML model 320 an MHC-based prediction 322, where the MHC-based prediction 322 represents an intermediate prediction of the immunogenic response prediction model 310 and includes at least one of a peptide-MHC binding prediction or a peptide-MHC cell surface presentation prediction.

In an example, a peptide-MHC binding prediction indicates, for at least one or each pair of a peptide (e.g., a candidate peptide from the repertoire) and an MHC class II molecule (e.g., one of the six to eight HLA alleles of the human subject), the probability that a T-cell binding with the pair. In comparison, a peptide-MHC cell surface presentation prediction indicates, for the at least one or each pair, the probability that an antigen presenting cell presents the pair for potential binding with a T-cell. The MHC-based prediction 322 can be expressed as $M(p,A)$ where "p" represents a peptide from the repertoire and included in a pair and "A" represents an MHC allele from the MHC alleles of the subject and included in the pair.

The calibration model 330 can include a linear or non-linear transformation function that transforms the MHC-based prediction 322 into the immunogenic response prediction 332. The immunogenic response prediction 332 indicates, for the at least one or each pair, the probability that the pair causing a positive immunogenic response (a CD4+ immunogenic response). The immunogenic response prediction 332 can be expressed as P(I|p,A) where "I" represents the targeted immunogenic response (e.g., the positive response).

Accordingly, P(I|p,A)=T(M(p,A)), where "T" is the transformation function of the calibration model 330. Different transformation functions are possible. For instance, the transformation function can be another ML model, a regression model, or the like. In a specific illustration, the transformation function is expressed as "T=$P_{\alpha,\beta}$(I|p, A)=[1+exp($\alpha$ log M(p,A)+$\beta$)]$^{-1}$," where "a" and "B" are calibration parameters.

Generally, the ML model 320 is trained first using MHC-restricted data. Thereafter, the calibration model 330 is configured by using MHC-unrestricted data. The type of configuration depends on the type of the transformation function. For instance, in the case of an ML model, the configuration includes training to tune the parameters of the ML model (e.g., weights of connections between nodes). In the case of the above T=$P_{\alpha,\beta}$(I|p, A) transformation, the configuration includes deriving the parameters "$\alpha$" and "$\beta$" through a search algorithm including, for instance, any of an expectation-maximization algorithm, a Monte Carlo algorithm, a Bayes algorithm, inference variational algorithm, or the like.

In an example, configuring the calibration model 330 can involve processing outputs of the already trained ML model 320. In such an example, a training feedback loop can be fed back from the calibration model to the ML model 320 such that the ML model 320 is further trained based on the outputs of the calibration model 330. An example of this training approach is further described in connection with FIG. 4.

Although FIG. 3 illustrates the use of both ML model 320 and calibration model 330 at an inference stage to generate the immunogenic response 332 for the subject, embodiments of the present disclosure are not limited as such. In particular, it may be sufficient to use one of the models 320 or 330. For instance, and as further described in connection with FIG. 6, the calibration model 330 can be used to augment the training data of the ML model 320. The ML model 320 is trained with at least the augmented training data to generate the MHC-based prediction 322 and/or the immunogenic response prediction 332.

Further, the outputs of the ML model 320 and/or the calibration model 330 can be used for other immunogenicity-related functions. For example, an immunogenic response prediction can be specific to a peptide-MHC molecule pair, such as to a particular peptide that can be manufactured and paired with HLA allele found in a subject, and can include an immunogenic score for the pair (e.g., a class II immunogenic response score). This prediction can be used to rank the peptide in a set of peptides identified for the subject (e.g., in other peptide-MHC molecule pairs). For instance, the immunogenic score for the pair is compared to those of the other pairs and the peptides across the different pairs are sorted in a descending order of their corresponding immunogenic scores. The ranked peptides can be used to produce a vaccine personalized for the subject. For instance, two peptides with two different immunogenic scores can be selected based on their ranking (e.g., selected over other peptides with lower immunogenic scores) and assigned to the same or different vaccine pools depending on their immunogenic scores. Additionally or alternatively, peptide-MHC binding predictions and/or peptide-MHC cell surface presentation predictions can be used to rank peptides, where the ranking is used for the vaccine development of the subject.

Figure 4:
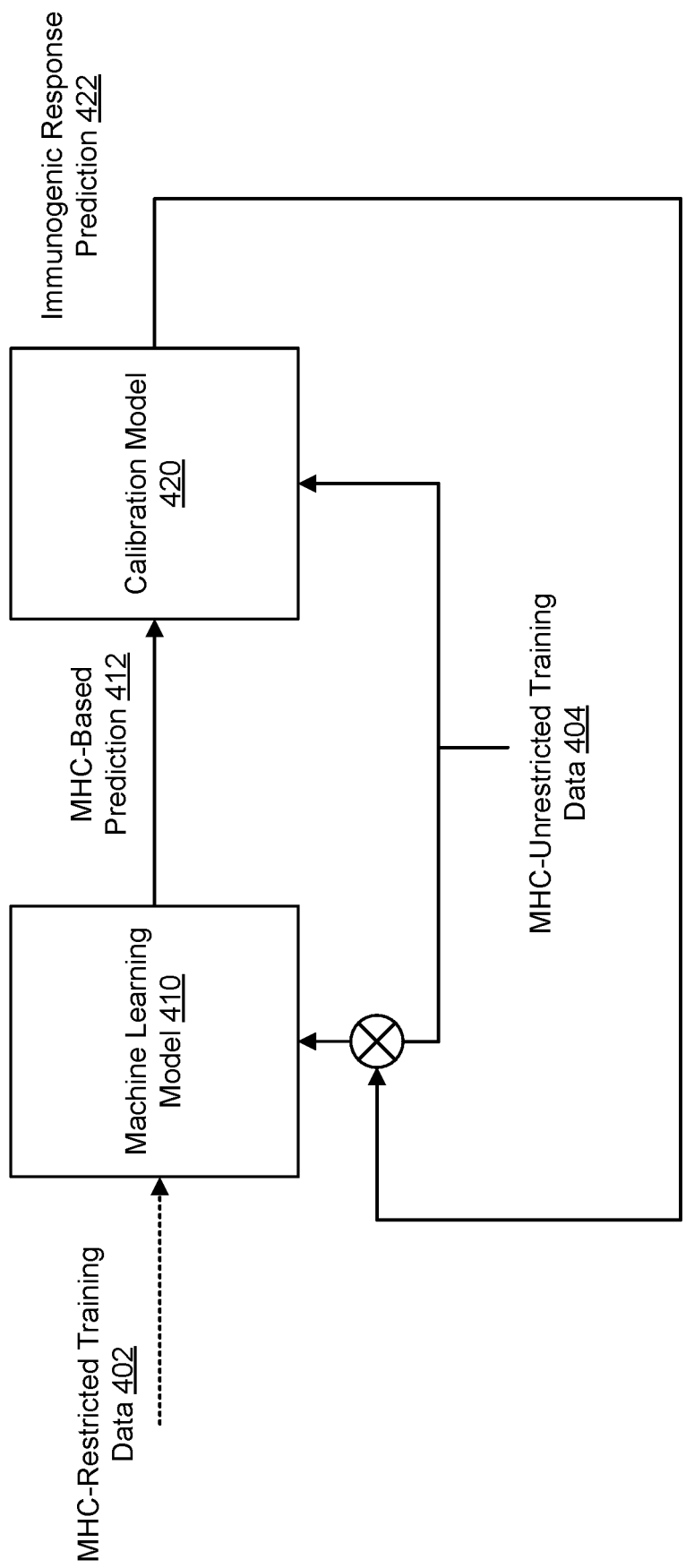
FIG. 4 illustrates an example of configuring an immunogenic response prediction model according to embodiments of the present disclosure.

FIG. 4 illustrates an example of configuring an immunogenic response prediction model according to embodiments of the present disclosure. This model can include an ML model 410 and a calibration model 420, which are examples of the ML model 320 and the calibration model 33, respectively, of FIG. 3. Generally, the ML model 410 is pre-trained (e.g., trained before the start of the configuring of the calibration model 420) with MC-restricted training data 402. This pre-training is illustrated with a dotted arrow as input to the ML model 410. In comparison, the calibration model 420 is configured with MHC-unrestricted training data 404.

A training feedback loop can exist, whereby outputs of the calibration 420 (illustrated in FIG. 4 as including an immunogenic response prediction 422) can be either fed back directly to the ML model 410 or used to edit the MHC-unrestricted training data 404 (thereby generating pseudo-training data) for further input to the ML model 410. In both cases, the training feedback loop allows further training of the ML model 410. The overall process can be iterative, whereby outputs from the ML model 410 (illustrated in FIG. 4 as including an MHC-based prediction 412) are used as inputs to the calibration model 420 to improve the performance of this calibration model 420, and the outputs of the calibration model 420 can be fed back, directly or indirectly, to the ML model 410 to further train the ML model 410 and improve its performance. The iterative process can be repeated until a convergence criterion is met. The convergence criterion can be a maximum number of iterations, a measure of the change to the performance of the calibration model 420 and/or ML model 410 (e.g., when the change between iterations becomes insignificant or below a predefined change threshold), or a measure of the change to the parameters of the calibration model 420 and/or ML model 410 (e.g., when the change between iterations becomes insignificant or below a predefined change threshold).

The MHC-restricted training data 402 can include multiple data elements organized, for instance, in rows of a table. Each data element can include a peptide and identify a specific MHC class II molecule (e.g., an MHC allele) that is paired with the peptide, the type of the immunogenic response caused by the pair (e.g., positive, negative, unknown), and a measure of the peptide-MHC cell surface presentation specific to this pair and/or a measure of the peptide-MHC binding affinity specific to this pair. Table 1 is shown below as an example with two HLA alleles (although a larger number of HLA alleles, or more generally, MHC alleles is possible such as between six and eight HLA alleles) and three data elements (although a larger number of data elements is possible). In Table 1, only one HLA entry per row is not equal to "-" to indicate the HLA allele specific to the pair formed with the corresponding peptide.

TABLE 1

| Peptide | HLA Allele_1 | HLA Allele_2 | Immunog. response | Binding Affinity |
| --- | --- | --- | --- | --- |
| ABCDE | A_1 | — | Unknown | 5000 nM |
| FGHIJ | — | A_2 | Yes | 10000 nM |
| KLMNO | A_3 | — | No | 100 nM |

Similarly, the MHC-unrestricted training data 404 can include multiple data elements organized, for instance, in rows of a table. Here, however, each data element can include a peptide and may identify multiple MHC class II molecules (e.g., an MHC allele), the type of the immunogenic response caused by the pairs formed by the peptide and a different one of the MHC class II molecules, and a measure of the peptide-MHC cell surface presentation associated with these different pairs and/or a measure of the peptide-MHC binding affinity associated with these different pairs. In other words, unlike the MHC-restricted training data 402, the MHC-unrestricted training data 404 may not identify, out of the different pairs, the specific peptide-MHC class II molecule pair that cause the type of the immunogenic response, the measure of the peptide-MHC binding affinity, and/or the measure of the peptide-MHC cell surface presentation. Table 2 is shown below as an example with two HLA alleles (although a larger number of HLA alleles, or more generally, MHC alleles is possible such as between six and eight HLA alleles) and three data elements (although a larger number of data elements is possible). In Table 2, more one HLA entry per row may not be equal to "-" to indicate multiple HLA alleles. Further, some of the HLA alleles in a data element may be unknown and are indicated as "unknown."

TABLE 2

| Peptide | HLA Allele_1 | HLA Allele_2 | Immunog. response | Binding Affinity |
|---|---|---|---|---|
| ABCDE | A_1 | A_2 | Unknown | 5000 nM |
| FGHIJ | A_1 | A_1 | Yes | Unknown |
| KLMNO | Unknown | A_4 | No | Unknown |

In an example, an expectation-maximization algorithm is used to configure the calibration model 420 and further train the ML model 410 using the MHC-unrestricted training data 404. Initially, the probability of each pair in a data element is initialized to a particular value, where the probability indicates the likelihood of the pair causing the type of the immunogenic response identified in the data element. Thereafter, the expectation-maximization algorithm is executed until convergence. In the expectation step at each iteration, the calibration model 420 outputs the probability for MHC allele in a pair of a data element that the MHC allele is responsible for the causing the type of the immunogenic response identified in the data element. The different probabilities are included in the immunogenic response prediction 422 at each iteration. In the maximization step at each iteration, the ML model 410 is retrained with the MHC-unrestricted training data 404, with each peptide in the MHC-unrestricted training data 404 paired with each possible MHC-allele weighted by the MHC allele probabilities determined in the expectation step at the current iteration. The weighting is illustrated in FIG. 4 with the multiplier element before the MHC-unrestricted training data 404 is input to the machine learning model 410. With the retrained machine learning model 410, the expectation step and maximization step cycle is repeated until convergence.

The next paragraphs describe a specific implementation of the expectation-maximization algorithm. Training data can exist, where peptides have been tested for CD4+ immunogenicity in a patient, but it is unknown which of the patient's Class-II alleles was responsible for MHC-II binding and presentation. In other words, this data can represent MHC-unrestricted data. It is advantageous to infer which of the Class-II alleles are responsible for driving immunogenicity and then use this inferred knowledge to improve our Class-II binding affinity or immunogenicity models via either further training or validation on immunogenicity test sets.

To do so, an expectation-maximization algorithm is defined with the following data types: Measurements=(Binding Affinity, Presentation, Immunogenicity), Alleles=(MHC Restricted, MHC Unrestricted; e.g., a combination of Table 1 and Table 2), Missing=(Some alleles missing, no alleles missing). An example of such data available from a corpus of measurements on patients is shown in Table 3 and represents training data containing MHC-restricted and MHC-unrestricted training data.

TABLE 3

| Peptide | HLA Allele_1 | HLA Allele_2 | Immunog. response | Binding Affinity |
|---|---|---|---|---|
| ABCDE | A_1 | A_2 | Unknown | 5000 nM |
| FGHIJ | A_1 | A_1 | Yes | Unknown |
| KLMNO | A_3 | — | Unknown | 10000 nM |
| ABCDE | Unknown | A_4 | No | Unknown |
| TUVWX | A_5 | — | Yes | Unknown |

This data format is a generalization of two types of data: (1) measurements of either immunogenicity or binding affinity for a peptide with either a single known HLA Allele via MHC restriction (one allele column is not equal to "-" all others are "-" corresponding to MHC-restricted training data); and (2) measurements of either immunogenicity or binding affinity for a peptide when one or more HLA alleles are known for the patient that was used in the peptide experiment, but it is not known which of the corresponding MHC molecules bind to the peptide (corresponding to MHC-unrestricted training data; "Unknown" means the allele is not known). Peptides may be repeated between patients. An assumption is made that in the above data no peptide has both an immunogenicity label and a binding affinity label.

Prior to the first expectation-maximization cycle, probabilities are initialized. Different initializations are possible depending if a peptide is included in MHC-restricted training data or MHC-unrestricted training data, and in the latter case, whether a data element includes an unknown MHC allele.

For a given peptide in the MHC-restricted training data, this data already indicates exactly which allele $A_{GT}$ is responsible for the measurement and the possible alleles are simply H={$A_{GT}$}. And the prior knowledge collapses onto this single HLA allele. In other words, the probability of this MHC allele in the data element is set to a value (e.g., one).

For a given peptide in the MHC-unrestricted training data, two cases are possible. In a first case, a data element of a patient identifies the given peptide and does not have any missing alleles (e.g., the set identifying the MHC class II molecules associated with the peptide is complete). The data element corresponds to a patient. In this case, all MHC alleles for the patient are already known, then the set of possible, unique alleles is simply H={$A_1$, . . . , $A_M$}. Any unique allele is equally likely with probability the same value of P=1/M. Note that for human patients, a homozygote can have M<6.

In a second case of a given peptide in the MHC-unrestricted training data, a data element of a patient identifies the given peptide and includes one or more missing alleles (e.g., the set identifying the MHC class II molecules associated with the peptide is incomplete). In this case, the data element is divided into alleles that are already known from experiment and those that are not. Suppose there are $m_{unknown}$ unique, known alleles and there are $m_{unk}$ alleles for which no experimental determination has been made. For each of the unknown alleles, all possible alleles for the missing HLA locus are determined and an assumption is made that the patient could have any of them with equal probability. The selection process in this case is hierarchical:

$H=\{A_{k1}, \ldots, A_{km_{known}}, \{A_{u1}, \ldots,\}_1, \ldots, \{A_{u1}, \ldots\}_{m_{unk}}\}$. An allele for this patient can be sampled by (1) randomly selecting an element from H; (2) if this is a set, a random subset from the set is chosen and step (1) is repeated; (3) if it is not a set, this is the sampled allele. Consequently, each known unique allele has a value for its probability $P=1/m_{known}$ and each possible unique allele at an unmeasured HLA locus can have a different value for its probability $P=1/m_{unk}/m_{locus}$, where $m_{locus}$ is the number of unique alleles in the data for that HLA locus.

Once the probabilities are initialized, an expectation-maximization algorithm is used to point-estimate which of a patient's HLA-II alleles is most likely to be driving immunogenicity. The expectation step infers which allele is most likely; the maximization step optimizes the immunogenicity and binding affinity predictors given the most likely alleles.

Different variables can be defined for the expectation-maximization algorithm. Let $x_i$ be the $i^{th}$ peptide, $d_i^I$ be the immunogenicity data label for $x_i$, $A_\alpha$ be the $\alpha^{th}$ HLA-II allele out of all known alleles (a subset H, as explained above, is available to any given patient), and $$d_i^{BA}$$

be the binding affinity label for $x_i$. The Class-II binding affinity predictor is defined as $$f_\theta^{BA}(x_i, A_\alpha)$$

which is parametrized by real numbers θ. Finally, the Class-II immunogenicity predictor is defined as $$f_\phi^I(x_i, A_\alpha)$$

which is parametrized by real numbers Ø. The combination of modeling parameters is referred to as $\Theta = \theta \cup \emptyset$ and the set of all other variables is referred to by just dropping the index.

The expectation-maximization algorithm follows the steps of:

1. Initialize: Set $\Theta^t \leftarrow \Theta_0$ at random.
2. Expectation step: Define $Q(\Theta|\Theta^t)$ t by calculating the probability of getting $$d_{i,\beta}^I$$

and $$d_{i,\beta}^{BA}$$

at known $\Theta^t$ and $\phi^t$ as discussed above.

3. Maximization step: Choose new parameters that maximize $\Theta = \arg\max_\Theta Q(\Theta|\Theta^t)$.
4. Repeat: Go to expectation step with $\Theta^t \leftarrow \Theta$ and repeat until convergence.

To run the expectation-maximization algorithm, the following quantity is used first, which has:

$$Q(\Theta|\Theta^t) = E_{A|d,\Theta^t}[\log P(d,A|\Theta)]$$

$$\propto \sum_{j=1}^{M} \sum_{i=1}^{N} P(A_i = j) P(d_i|A_i = j, \Theta^t) \log[P(d_i|A_i = j, \Theta)] + const$$

In this expression, j sums over all of the M HLA alleles in the dataset, not just those that a given patient has. i sums over all of the N elements in the dataset, not just the binding affinity data or the immunogenicity data.

The log-likelihood functions are expressed as:
Binding affinity: The binding affinity models (e.g., the ML model 410) are trained with a modified mean squared error (MSE) loss. Minimizing this is equivalent to maximizing the log-likelihood of a Gaussian.

$$P(d_i^{BA}|A_i, \Theta)$$

is assumed as a Gaussian with standard deviation equal to σ.

Immunogenicity: models (e.g., the ML model 410) are trained to predict whether peptide-MHC pairs are immunogenic or not, using the binary cross entropy loss. Minimizing this is equivalent to maximizing the log-likelihood of a Bernoulli distribution, which $$P(d_i^I|A_i, \phi)$$

is assumed.

The choice of $f_\Theta$ can impact the latency of executing the maximization step. However, the specific details of $f_\Theta$ are relatively independent of the expectation-maximization approach for MHC restriction. At minimum, $f_\Theta$ should have the following properties:

1. It can identify peptide features that depend on an amino acid's location in the primary sequence, such as the position of anchor residues.
2. It can differentiate MHC alleles, but also generalizes to new alleles not in the training set, since not a lot of allele coverage may exist in the small immunogenicity datasets.

For instance $f_\Theta$ is used from the A deep attentional model for predicting pan-allele and allele-specific epitope binding to Class II MHC molecules for Class II binding affinity.

In an example, given a peptide p and an HLA-II allele A, binding affinity predictions M(p, A) are output from the ML model 410. These outputs should be transformed into a probability of immunogenicity P(I|p, A). This transformation can be performed by parametrizing $P_{\alpha,\beta}(I|p, A) = [1 + \exp(\alpha \log M(p,A) + \beta)]^{-1}$, which is equivalent to Platt scaling the ML model 410's output. Alleles are assigned to patients in the expectation step and the calibration parameters α, β are learned in the maximization step.

In this example, the model is set as $P_{\alpha,\beta}(I|p, A) = [1 + \exp(\alpha \log M(p, A) + \beta)]^{-1}$ (HLA-restricted) and (patient-restricted)

$$P(I = 1|p, \{A_1, \ldots, A_N\}) = 1 - \prod_i^N (1 - P(I|p, A_i)).$$

Pre-processing is performed, whereby for each of the patient-peptide pairs in the data, the binding affinity of this peptide is computed for each known DRB allele using the ML model 410. In the expectation step, the prior $P(\{DRB_1, DRB_2\})=P(DRB_1)P(DRB_2)$ are computed based on population frequencies of each DRB allele, separately. Then, the probability $P(I=1|p, \{DRB_i, DRB_j\})$ is computed for each peptide and each pair of DRB alleles at fixed $\alpha$, $\beta$, using the parametrization above. For each patient, the probability $P(\{p\}|\{DRB_i, DRB_j\})=\Pi_k P(p_k|\{DRB_i, DRB_j\})$ is computed over the set of peptides that the patient has been tested on. $Q(\alpha, \beta|\alpha^t, \beta^t)$ is defined using the above distributions. In the maximization step, the calibration parameters are maximized, whereby $\alpha, \beta \leftarrow \arg\max Q(\alpha, \beta|\alpha^t, \beta^t)$.

Different values of $\alpha$, $\beta$ are possible and can depend on the underlying training dataset. In one particular example, $\alpha=0.5$, $\beta=-1$.

Figure 5:
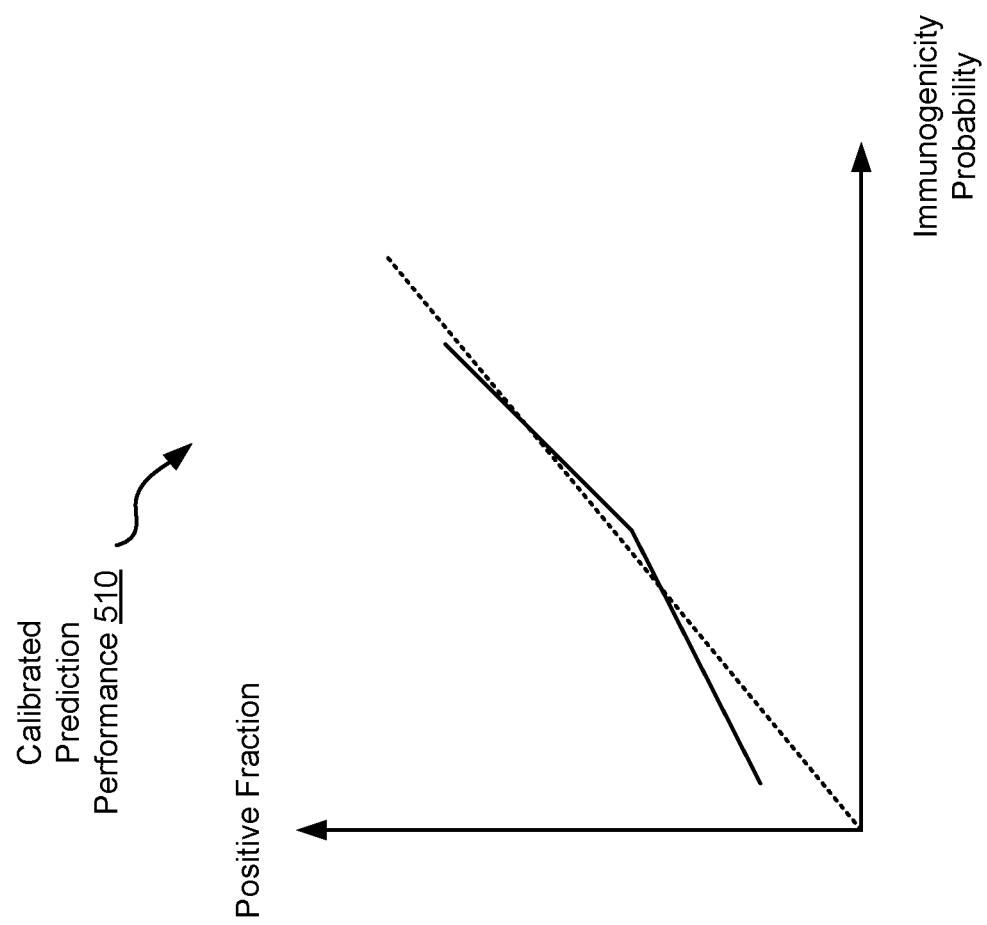
FIG. 5 illustrates an example of a calibrated prediction performance according to embodiments of the present disclosure.

FIG. 5 illustrates an example of a calibrated prediction performance 510 according to embodiments of the present disclosure. In the illustration of FIG. 5, the calibration prediction performance 510 represents a measurement of how well an immunogenic response prediction model, such as the immunogenic response prediction model 310 of FIG. 3, when configured with a calibration model, such as the calibration model 420 of FIG. 4. One measure of the performance can be expressed as the positive fraction of alleles in an assay responsible for a positive immunogenic response (shown on the vertical axis) as a function of the immunogenic probability (shown on the horizontal axis). An optimum performance is a line with a slope of one (shown as a dotted line in FIG. 5), where, for instance, a 20% fraction is associated with a 20% probability of positive immunogenic response. The calibrated prediction performance 510 is the actual performance derived from experimentation per the expectation-maximization implementation described in connection with FIG. 4.

As shown, the calibrated prediction performance 510 is significantly close to the optimum performance, thereby indicating that the immunogenic response prediction model's configuration is near optimum. Further, because of this near linear distribution (where the slope is almost one), it becomes possible to predict significant differences between the effectiveness of peptides even when the difference between the peptides is insignificant (e.g., they defer by one or a few amino acids).

Figure 6:
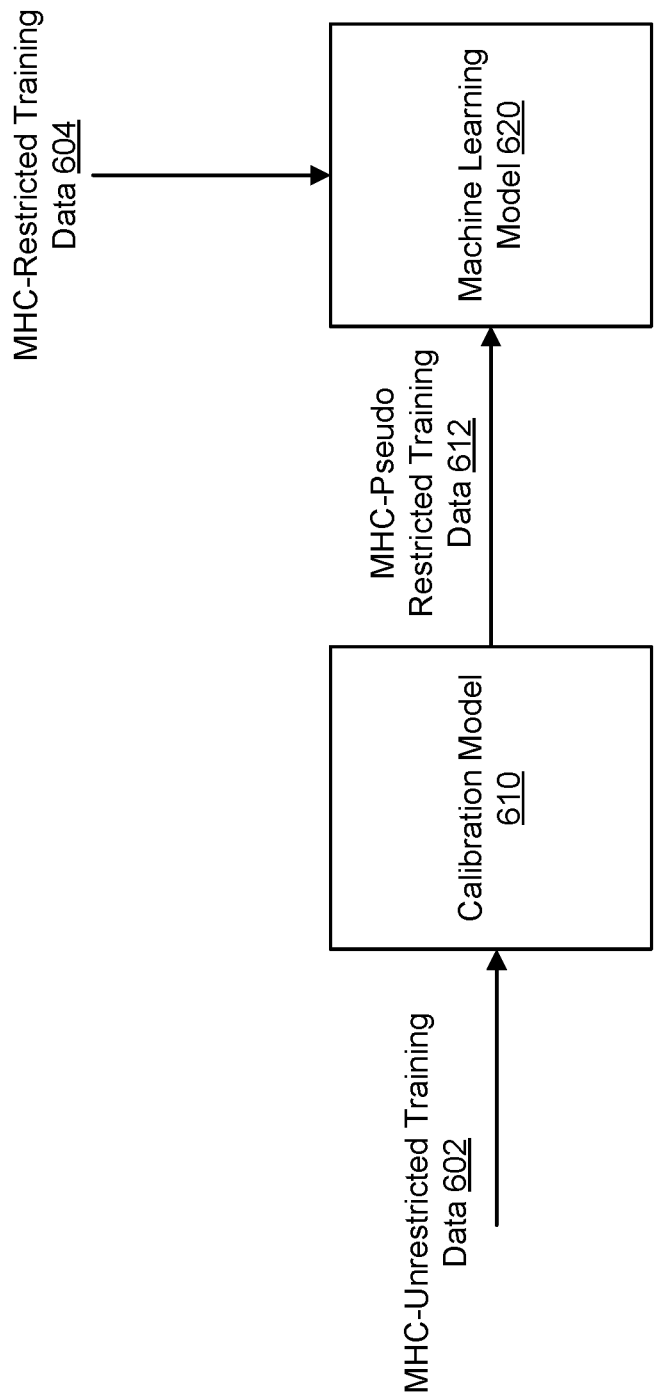
FIG. 6 illustrates another example of configuring an immunogenic response prediction model according to embodiments of the present disclosure.

FIG. 6 illustrates another example of configuring an immunogenic response prediction model according to embodiments of the present disclosure. Here, the model also includes a calibration model 610 and an ML model 620. However, rather than using the calibration 610 model as a transformation layer at the inference stage, the calibration model 610 may be used in the training of the ML model 620 and may not be used at the inference stage.

In an example, the calibration model 610 can be similar to the calibration model 330 of FIG. 3 or the calibration model 420 of FIG. 4. The calibration model 610 may, but need not, be configured by using a pre-trained ML model, such as illustrated in FIG. 4. MHC-unrestricted training data 602 is input to the calibration model 610. In turn, MHC-pseudo restricted training data 612 is output of the calibration model 610. The MHC-unrestricted data identifies per data element, a peptide, a set of MHC class II molecules, and an immunogenic response (or binding and/or presentation information, as described herein above), but does not identify which one of the MHC class II molecules causes, in combination with the peptide, the immunogenic response (or binding and/or presentation information). In comparison, the MHC-pseudo restricted training data 612 indicates per data element, a likelihood of the immunogenic response (or binding and/or presentation information) per peptide-MHC class II molecule pairs of the data element. MHC-pseudo restricted training data 612 is different from MHC-restricted data because the MHC-restricted data indicates a specific pair that is responsible.

The ML model 620 may have been, but need not be, pre-trained and used in the configuring of the calibration model 610. Either way, the MHC-pseudo restricted training data 612 is input to the ML model 620 during the training thereof. Further, MHC-restricted training data 604 can be input to the ML model 620. In this way, the MHC-pseudo restricted training data 612 represents an augmentation of the HC-restricted training data 604. The ML model 620 can be trained to output peptide-MHC binding predictions, peptide-MHC surface cell presentation predictions, and/or immunogenic response predictions.

Figure 7:
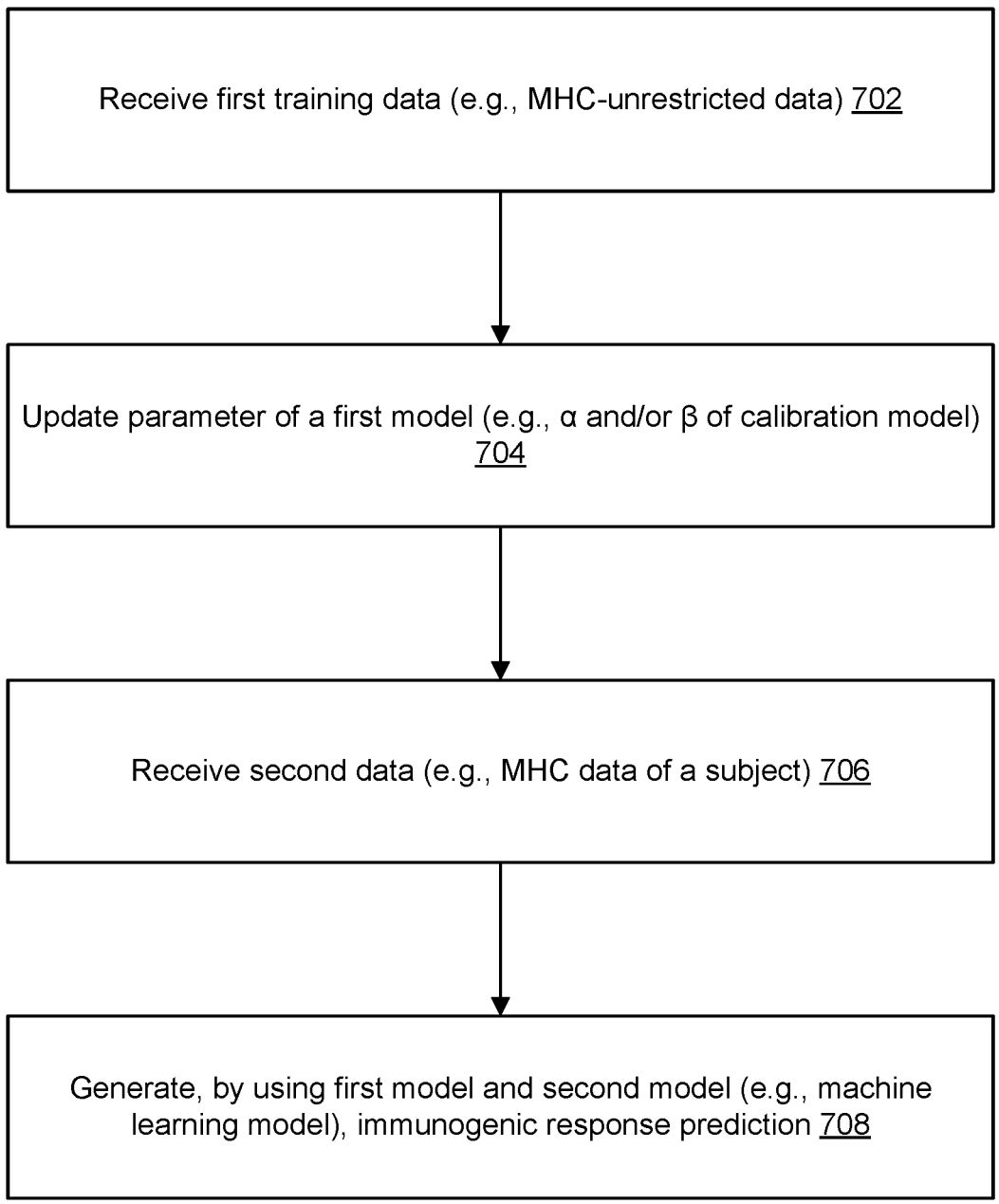
FIG. 7 illustrates an example of a flow for configuring and using an immunogenic response prediction model according to embodiments of the present disclosure.
Figure 8:
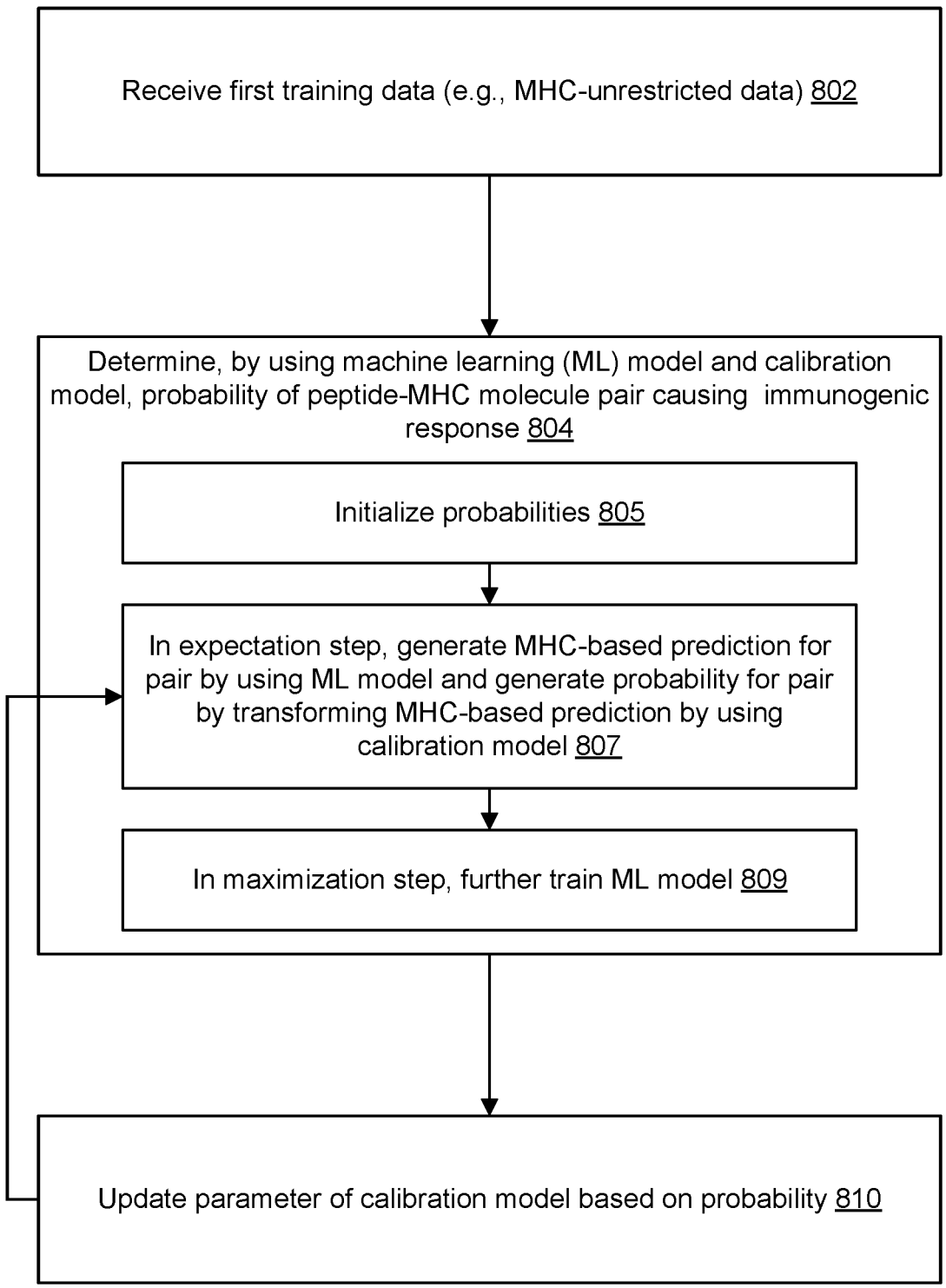
FIG. 8 illustrates an example of a flow for configuring an immunogenic response prediction model according to embodiments of the present disclosure.
Figure 9:
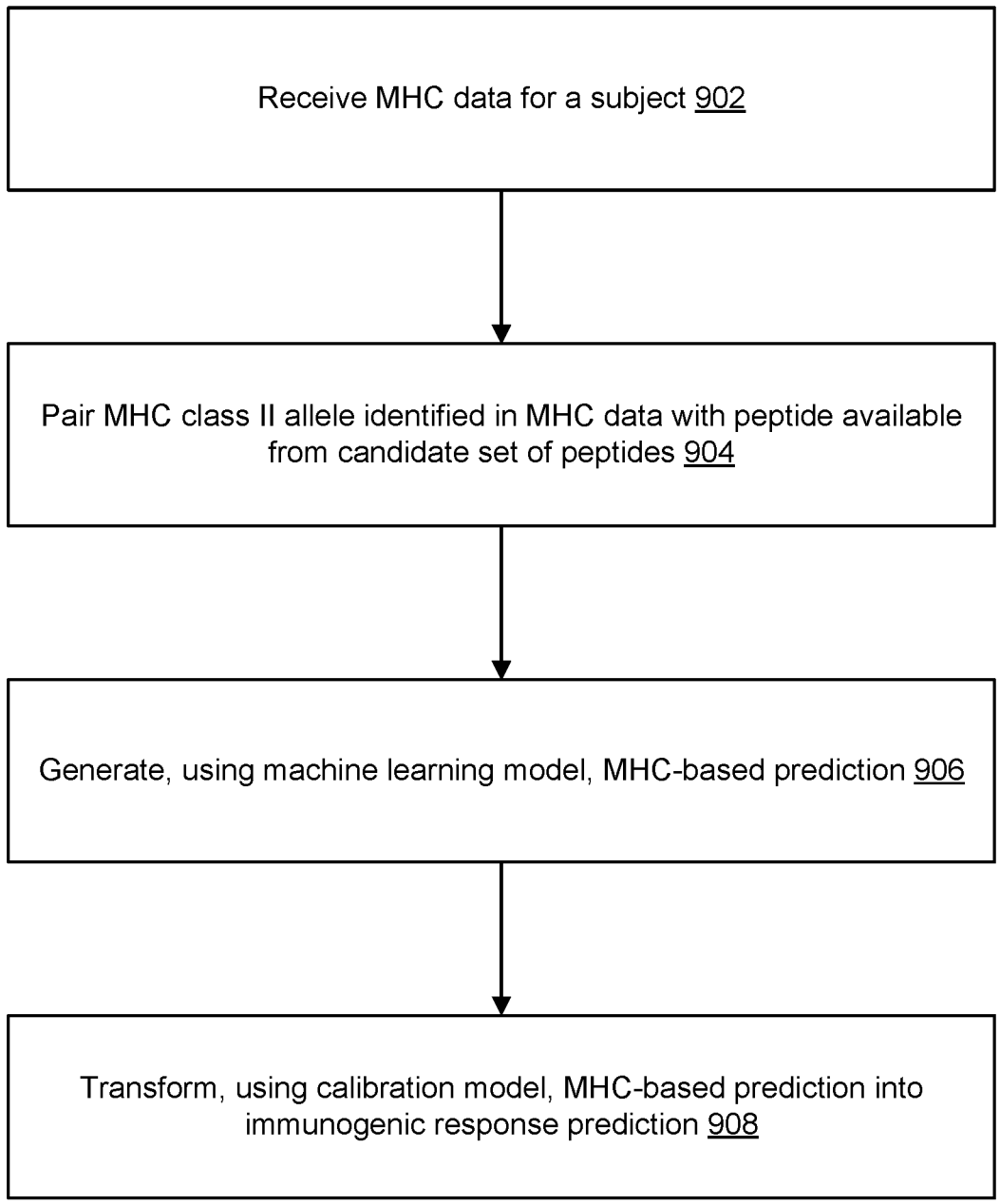
FIG. 9 illustrates an example of a flow for generating an immunogenic response prediction according to embodiments of the present disclosure.

FIGS. 7-9 illustrate examples of flows for using an immunogenic response prediction model according to embodiments of the present disclosure. A computer system, similar to the computer system 110 of FIG. 1, is described as performing operations of the example flows. Instructions for performing the operations can be stored as computer-readable instructions on one or more non-transitory computer-readable media of the computer system. As stored, the instructions represent programmable modules that include code or data executable by one or more processors of the computer system. The execution of such instructions configures the computer system to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

FIG. 7 illustrates an example of a flow for configuring and using the immunogenic response prediction model according to embodiments of the present disclosure. As illustrated, the flow can start at operation 702, where the computer system receives first training data. In an example, the first training data includes MHC-unrestricted data developed, through experimental measures, for multiple subjects (e.g., human patients). The first training may, but need not include, MHC-restricted data. The MHC-unrestricted data and, optionally, the MHC-restricted data can be received from a data store, such as a database accessible to the computer system. Generally, the first training data includes data elements. Each data element identifies a peptide and a set of MHC class II molecules, and one or more of an immunogenic response, a peptide-MHC binding measure, or a peptide-MHC cell surface presentation measure. In the case of MHC-unrestricted data, the set includes multiple MHC class II alleles. If the set is missing an MHC class II allele (e.g., this allele was not identified or recorded during the experimental measure), the set is declared as incomplete. Otherwise, the set is declared as complete. In the case of MHC-restricted data, the set identifies a single MHC class II molecule responsible for the one or more of the immunogenic response, the peptide-MHC binding measure, or the peptide-MHC cell surface presentation measure.

At operation 704, the computer system updates a parameter of a first model based on the first training data. The first model can be a calibration model, in which case the parameter can be a calibration parameter. In an example, the first model can be iteratively configured by processing the first training data, where a probability per peptide-MHC class II molecule pair is output at each iteration, and where the probability is fed back into a next iteration to further improve the performance of the first model and refine the parameter. The probability for a pair can be a probability of the pair causing the immunogenic response indicated in the pair's data element. As described herein above in connection with the illustrative example of the transformation function "T," the update can be performed for two calibration models a and B and by using an expectation-maximization algorithm that involves, in the expectation step, the first model and, in the maximization step, a second model (e.g., an ML model) that was previously trained.

At operation 706, the computer system receives second data. For example, MHC data of a subject is received from a user device. The MHC data can be developed through genome sequencing of cancerous cells of the subject and can identify for the subject MHC class II molecules available in the subject's body. In the case of a human patient, the MHC data can identify between six and eight HLA class II molecules.

At operation 708, the computer system generates, by using the first model and the second mode, an immunogenic response prediction for the subject based on the MHC data. For example, a data base stores identifiers of potential peptides that may be paired with the MHC class II alleles indicated by the MHC data. The computer system can generate candidate pairs, where each pair includes a peptide and one of the MHC class II alleles. The candidate pairs are input to the second model that, in turn, outputs a peptide-MHC binding prediction and/or a peptide-MHC cell surface presentation prediction. This output is input to the first model that, in turn, outputs a probability for a targeted immunogenic response (e.g., a positive one) per candidate pair. The collection of these probabilities and the corresponding pairs for the immunogenic response predictions. The pairs that have the highest probabilities (or probabilities over a predefined probability threshold) can be used to develop cancer vaccine for the subject, where this vaccine include peptides identified by such pairs.

FIG. 8 illustrates an example of a flow for configuring the immunogenic response prediction model according to embodiments of the present disclosure. As described herein above, the immunogenic response prediction model includes a first model (e.g., a calibration model) and a second model (e.g., an ML model). The second model may be pre-configured (e.g., the ML model was previously trained based on MHC-restricted data to output peptide-MHC binding predictions and/or peptide-MHC cell surface presentation predictions). The configuration derived from the flow of FIG. 8 can include updating parameters of the first model and, optionally, updating parameters of the second model. Operations of the flow of FIG. 8 can be implemented as sub-operations of operation 704 of FIG. 7.

In an example, the flow of FIG. 8 starts at operation 802, where the computer system receives first training data that includes, for instance, MHC-unrestricted data. This operation 802 is similar to the operation 702 of FIG. 7.

At operation 804, the computer system determines by using the second model (e.g., the ML model) and the first model (e.g., the calibration model), a probability of a peptide-MHC molecule pair causing an immunogenic response indicated by a data element from which the elements of this pair are derived. For example, each data element identifies, in addition to the immunogenic response, a peptide and multiple MHC class II molecules. Multiple pairs are formed for this data element, each pair identifying the peptide and a different one of the MHC class II molecules. The probability of each of the data element's pair causing the corresponding immunogenic response is determined by execution an expectation-maximization algorithm that involves, in the expectation step, the first model, and, in the maximization step, the second model. The execution can be performed in multiple sub-operations 805-809 of operation 804.

At sub-operation 805, the computer system initializes the probabilities of the different pairs. The value used for a probability of a pair depends on whether this pair was derived from MHC-restricted data (in the case where the first training data includes such data) or from MHC-unrestricted data and, in the latter case, whether the set identifying the MHC class II molecules is complete or incomplete. In the case where a pair of a data element is derived from MHC-restricted data, the value of its probability is initialized to one. In the case where a pair of a data element is derived from MHC-unrestricted data and the corresponding set in the data element is complete, the value corresponds to an equal probability for all the pairs derived for the data elements (e.g., all these pairs are initialized to the same value). In the case where a pair of a data element is derived from MHC-unrestricted data and the corresponding set in the data element is incomplete, the values can vary for the pairs. For instance, a first pair indicates one of the MHC class II molecules that is present from the data element. In this illustration, the probability for this first pair is initialized to a first value based on a first total number of MHC molecules that are present in the first set (e.g., $P=1/m_{known}$, where "$m_{known}$" is the first total number). In comparison, at a particular locus of the data element, an MHC class II allele is missing. In this case, a second pair is formed based on candidate MHC class II alleles that can be used at this locus. The probability of the second pair is set to a second value, where the second value is different from the first value and is based at on a second total number of MHC molecules that are missing from the data element (e.g., $P=1/m_{unk}/m_{locus}$, where "$m_{locus}$" is the second total number, and where "$m_{locus}$" is the number of unique alleles in the data for that HLA locus).

At sub-operation 807, the computer system generates, in an expectation step, an MHC-based prediction for each pair by using the second model (e.g., the ML model) and a probability for the pair by transforming the MHC-based prediction by using the first model (e.g., the calibration model). For example, a pair is input to the ML model, where this input is weighted by the corresponding probability that was initialized at sub-operation 807 (in the initial expectation-maximization cycle) or that was previously output by the calibration model (e.g., in the previous expectation-maximization cycle). In response, the ML model outputs the MHC-based prediction and this prediction can include at least one of a peptide-MHC binding prediction or a peptide-MHC cell surface presentation prediction. This output is input to the calibration model that transforms it into the probability of the pair causing the immunogenic response indicated by the pair's data element. Here, the transformation uses the a and B that were updated in the previous expectation-maximization cycle. This process can be repeated in each expectation-maximization step for the different pairs.

At sub-operation 809, the computer system further trains the second model in the maximization step. For example, a feedback loop exists where the MHC-unrestricted data is input to the ML model. The input corresponding to a pair is weighted by the corresponding probability that was determined at sub-operation 807.

At operation 810, the computer system updates a parameter (e.g., a and/or B) of the first parameter based on the probabilities. For instance, a maximization function is used to update these two parameters. Additionally, parameters of the ML model, such as the weights of the connection between different nodes at different layers, can be updated. Operation 810 can loop back to sub-operation 807 to start the next expectation-maximization cycle until a convergence criterion is met. At that point, the parameter(s) is (are) set and no further updates are performed.

FIG. 9 illustrates an example of a flow for generating the immunogenic response prediction according to embodiments of the present disclosure. As described herein above, the immunogenic response prediction model includes a first model (e.g., a calibration model) and a second model (e.g., an ML model) that have been configured per the flow of FIG. 8. Operations of the flow of FIG. 9 can be implemented as sub-operations of operation 708 of FIG. 7.

In an example, the flow of FIG. 9 starts at operation 902, where the computer system receives MHC data for a subject. This operation 902 is similar to the operation 706 of FIG. 7.

At operation 904, the computer system pairs an MHC class II allele identified in the MHC data with a peptide available from a candidate set of peptides. This candidate set can be identified in a database accessible to the computer system.

At operation 906, the computer system generates, using the second model (e.g., the ML model), an MHC-based prediction for the pair. This prediction can include at least one of a peptide-MHC binding prediction or a peptide-MHC cell surface presentation prediction.

At operation 908, the computer system transforms, using the first model (e.g., the calibration model), the MHC-based prediction into an immunogenic response prediction. The transformation can include the transformation function "T" described herein above. The immunogenic response prediction can include a probability of the pair causing a targeted immunogenic response.

Although not illustrated in FIG. 9, immunogenic response prediction can be used for a vaccine development of the subject. For example, multiple immunogenic response predictions can be generated, each specific to a different peptide-MHC molecule pair. The peptides of these pairs may be candidate peptides that can be manufactured and added to one or more vaccine compositions for the subject. The MHC molecules of the pairs may correspond to MHC alleles identified from a biopsy of the subject. The immunogenic response predictions can be used to rank the peptides. The ranked peptides can be used to produce the vaccine. For instance, two peptides with two different immunogenic scores can be selected based on their ranking (e.g., selected over other peptides with lower immunogenic scores) and assigned to the same or different vaccine pools depending on their immunogenic scores.

Figure 10:
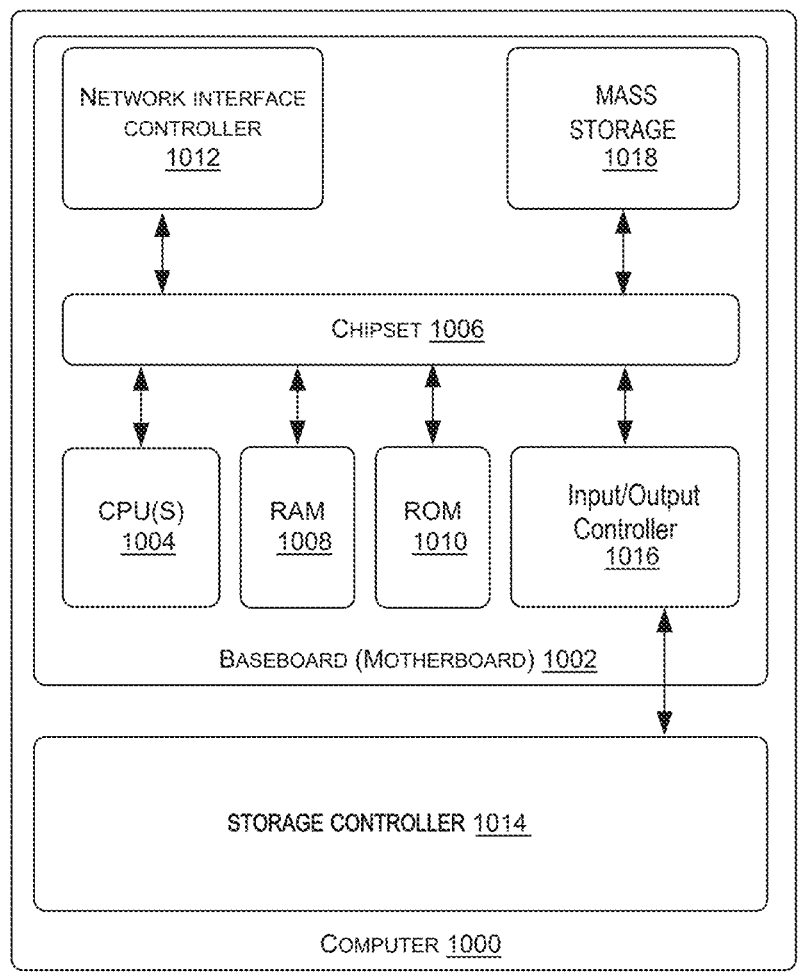
FIG. 10 illustrates aspects of an example environment for implementing aspects in accordance with various embodiments.

FIG. 10 illustrates aspects of an example environment for implementing aspects in accordance with various embodiments. This architecture may be used to implement some or all of the components of the computer systems (e.g., the computer system 110 of FIG. 1) described herein above. The computer architecture shown in FIG. 10 illustrates a server computer, workstation, desktop computer, laptop, tablet, network appliance, personal digital assistant ("PDA"), e-reader, digital cellular phone, or other computing device, and may be utilized to execute any aspects of the software components presented herein.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 1020. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1018 may store other system or application programs and data utilized by the computer 1000. The mass storage device 1018 might also store other programs and data not specifically identified herein.

In one embodiment, the mass storage device 1018 or other computer-readable storage media is encoded with computer-executable instructions which, when loaded into the computer 1000, transforms the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various routines described above. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10. It should also be appreciated that many computers, such as the computer 1000, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "$\alpha$" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method comprising:
performing genome sequencing on a biopsy from a subject;
receiving, from a device, data that corresponds to an output of the genome sequencing and that identifies a first set of histocompatibility complex (MHC) molecules of the subject;
executing first program code for a first model and second program code for a second model, to generate an immunologic response prediction of pairing a peptide with a MHC molecule identified in the first set, wherein:
first output of executing the first program code is automatic input to executing the second program code;
second output of executing the second program code is feedback input to updating the first model;
the first model and the second model are separate from each other;
the first model is pre-trained based at least in part on first training data that identifies a first immunologic response prediction of a peptide-MHC molecule pair;
the second model is pre-trained based at least in part on second training data that identifies a second immunologic response prediction of a peptide pairing with different MHC molecules; and
the second model updates a third immunologic response prediction of the first model corresponding to the pairing of the peptide and the MHC molecule to generate the immunologic response prediction, the third immunologic response prediction indicated by the first output of executing the first program code and included in the automatic input to executing the second program code;
sending, to the device, the immunologic response prediction; and
causing a vaccine to be produced for the subject based at least in part on the immunologic response prediction.

2. The method of claim 1, further comprising:
determining a value of a calibration parameter by using a probability in a maximization step of an expectation-maximization algorithm; and
training the second model by using the first training data in a maximization step of the expectation-maximization algorithm, wherein a weight is assigned to a portion of the first training data in the maximization step based at least in part on the probability.

3. The method of claim 2, further comprising:
initializing the probability to a value, wherein the value is the same for pairs each formed by the peptide and a different MHC molecule identified in the first set.

4. The method of claim 2, further comprising:
initializing the probability to a value based at least in part on a total number of MHC molecules that are present in the first set.

5. The method of claim 1, further comprising:
determining that the peptide-MHC molecule pair has the highest probability of causing an immunogenic response among pairs each formed by the peptide and a different MHC molecule, wherein a parameter of the second model is updated based at least in part on the highest probability.

6. The method of claim 1, further comprising:
generating, by using the first model, an intermediate prediction for the pairing of the peptide with the MHC molecule, wherein the intermediate prediction comprises at least one of a peptide-MHC binding prediction or a peptide-MHC cell surface presentation prediction; and
generating, by using the second model, a probability of the pairing causing an immunogenic response based at least in part on the intermediate prediction, wherein a parameter of the second model is updated based at least in part on the probability.

7. The method of claim 1, further comprising:
generating, by using the first model, at least one of a peptide-MHC binding prediction or a peptide-MHC cell surface presentation prediction for the pairing of the peptide and the MHC molecule; and
generating, by using the second model, a probability of causing an immunogenic response for the pairing, wherein the probability is generated based at least in part on the peptide-MHC binding prediction or the peptide-MHC cell surface presentation prediction.

8. The method of claim 7, wherein the probability is generated by using a transformation of the second model, wherein the transformation includes a parameter of the second model.

9. The method of claim 1, further comprising:
training the first model by using the first training data, wherein a weight is assigned to the peptide-MHC molecule pair in the training based at least in part on a probability of an immunologic response.

10. The method of claim 9, further comprising:
training the first model by using third training data, wherein the third training data indicates whether each one of the peptide pairing with different MHC molecules causes an immunogenic response.

11. The method of claim 10, wherein the first model is trained with the third training data prior to being trained with the first training data.

12. The method of claim 1, further comprising:
training the first model by using third training data, wherein the third training data indicates whether each one of multiple peptide-MHC molecule pairs causes a first immunogenic response; and
after training the first model with the third training data:
determining a value of a parameter of the first model by using a probability of the first immunogenic response in an expectation step of an expectation-maximization algorithm; and
further training the first model by using the first training data in a maximization step of the expectation-maximization algorithm.

13. The method of claim 1, further comprising:
generating, by using the first model, at least one of a peptide-MHC binding prediction or a peptide-MHC cell surface presentation prediction for the pairing of the peptide and the MHC molecule; and
generating, by using the second model, a probability of causing an immunogenic response for the pairing wherein the second model includes a transformation that outputs the probability based at least in part on the peptide-MHC binding prediction or the peptide-MHC cell surface presentation prediction.

14. The method of claim 1, wherein the first training data is associated with a plurality of subjects and comprises a set of MHC molecules that is incomplete.

15. The method of claim 1, wherein the first training data is associated with a plurality of subjects and comprises a set of MHC molecules that is complete.

16. The method of claim 1, further comprising:
- determining a locus of a candidate MHC molecule in a first set of MHC molecules;
- determining a first total number of candidate MHC molecules at the locus;
- determining a second total number of missing candidates from the first set; and
- initializing a probability associated with the candidate MHC molecule to a value based at least in part on the first total number and the second total number.

17. The method of claim 1, further comprising:
- initializing a first probability for a first peptide-MHC molecule pair to a first value, wherein the second training data is associated with a plurality of subjects, and wherein a first set of MHC molecules is associated with a first subject of the plurality of subjects;
- determining that the first training data indicates, for a second subject of the plurality of subjects, a second peptide-MHC molecule pair causes an immunogenic response; and
- initializing a second probability for the second peptide-MHC molecule pair to a value of one, wherein a parameter of the second model is further updated based at least in part on the second probability.

* * * * *